D. H. MORRELL.
DINNER PAIL.
APPLICATION FILED DEC. 6, 1909.
963,621.
Patented July 5, 1910.
2 SHEETS—SHEET 1.
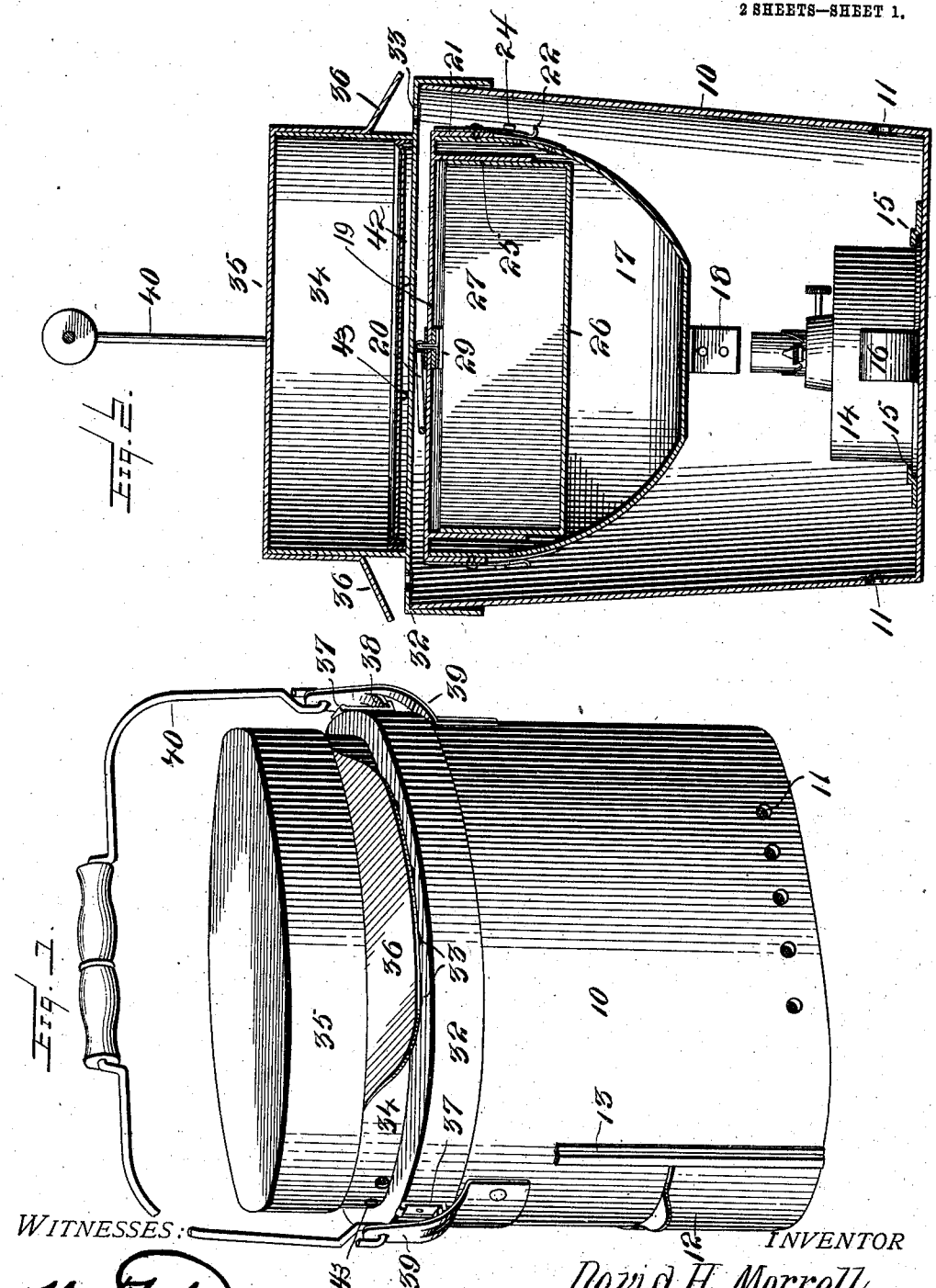
WITNESSES:
INVENTOR
David H. Morrell.
BY
Attorney D. H. MORRELL.
DINNER PAIL.
APPLICATION FILED DEC. 6, 1909.
963,621.
Patented July 5, 1910.
2 SHEETS—SHEET 2.
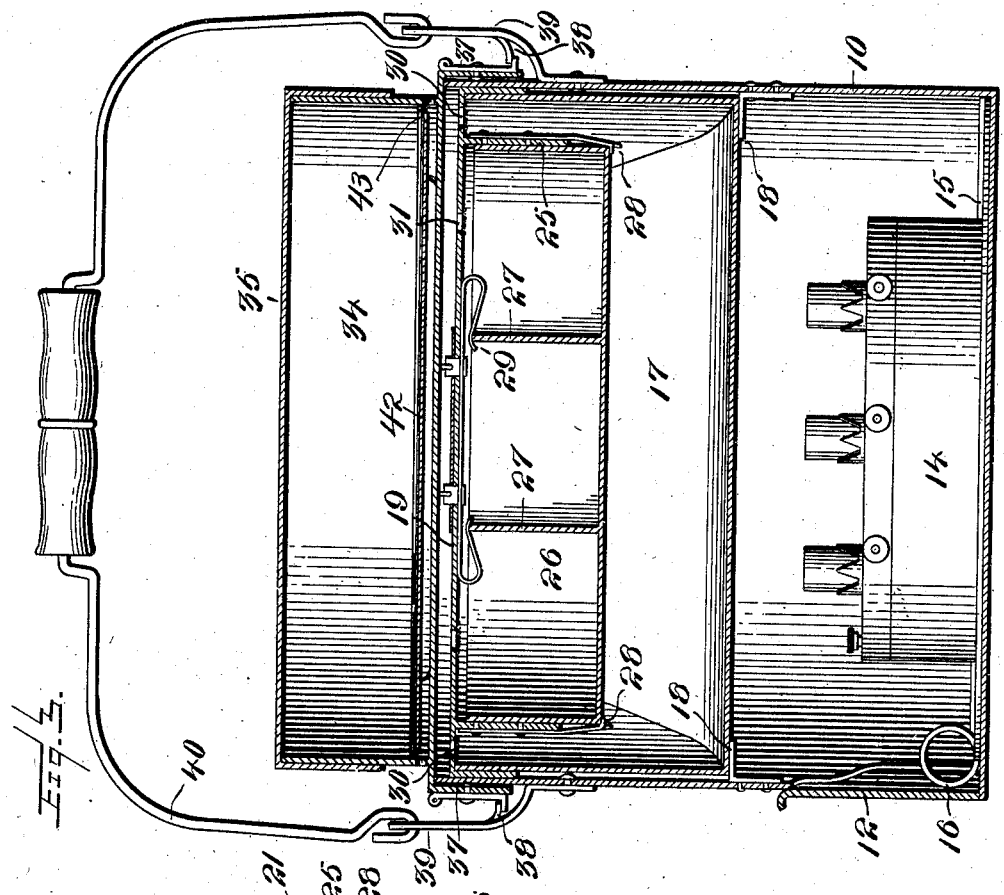
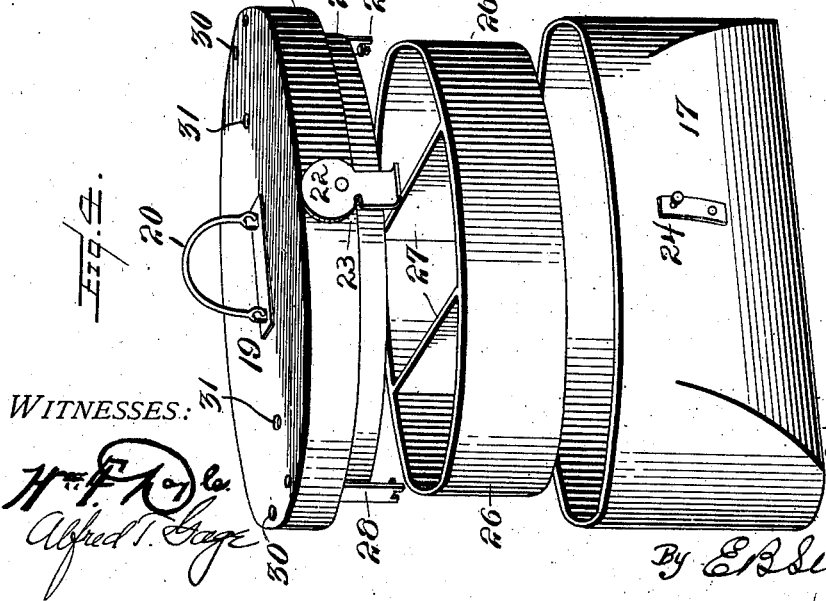
WITNESSES:
INVENTOR
David H. Morrell
By E. B. Stocking
Attorney

UNITED STATES PATENT OFFICE.

DAVID H. MORRELL, OF MARION, INDIANA.

DINNER-PAIL.

963,621.  Specification of Letters Patent.  Patented July 5, 1910.

Application filed December 6, 1909. Serial No. 531,602.

*To all whom it may concern:*

Be it known that I, DAVID H. MORRELL, a citizen of the United States, residing at Marion, county of Grant, State of Indiana, have invented certain new and useful Improvements in Dinner-Pails, of which the following is a specification, reference being had therein to the accompanying drawing.

This invention relates to a dinner pail and particularly to a construction having a plurality of receptacles adapted to be heated.

The invention has for an object to provide a novel and improved construction embodying a pail or bucket provided with a heating device and a liquid receptacle disposed to be heated thereby together with other receptacles adapted to be heated by the steam from the liquid receptacle.

Other and further objects and advantages of the invention will be hereinafter set forth and the novel features thereof defined by the appended claims.

In the drawings—Figure 1 is a perspective of the invention; Fig. 2 is a vertical cross section thereof; Fig. 3 is a vertical longitudinal section thereof; and Fig. 4 is a detail perspective showing the parts of the heated receptacles separated.

Like numerals of reference refer to like parts in the several figures of the drawings.

The numeral 10 designates the body of the pail or receptacle which is provided with a series of screened draft openings 11 and a slide door 12 mounted in ways 13 to permit the insertion within the receptacle of a heater 14 which may be of any desired construction or configuration. This heater may comprise a liquid burner and is slidingly mounted in ways 15 at its opposite sides and provided with a handle 16 for withdrawal through the opening in the pail covered by closure 12. Within the pail a liquid receptacle 17 is supported by means of brackets 18. The pail may be of any desired configuration but is here shown as oval with the bracket 18 at its opposite ends.

The cover 19 of the liquid receptacle is provided with a handle 20 and with a depending flange 21 spaced from said receptacle 10. This flange has mounted thereon a swing plate 22 formed with an aperture 23 adapted to engage a pin 24 mounted upon the liquid receptacle 17. The cover 19 is also formed with a depending flange 25 within which a receptacle 26, for vegetables or other articles to be heated, is disposed. This receptacle is provided with partitions 27 to permit the separate heating of different articles of food by the steam or vapors arising from the liquid within the receptacle 17. The receptacle 26 is retained upon the cover 19 by means of clasps 28 mounted upon the cover flange 25 and engaging the bottom of the receptacle 26 as shown in Fig. 3. The cover 19 is also provided with spring members 29 which engage the partitions 27 in order to effect the removal of the receptacle 26 from the cover by their pressure thereon. The cover is provided with apertures 30 to permit the escape of steam from the liquid receptacle and also with apertures 31 to permit the escape of vapor from the receptacle 26.

The pail 10 is provided with a flanged cover 32 having apertures 33 therein to effect a proper draft for the heater about the sides of the liquid receptacle 17 which is spaced from the side walls of the pail. Upon the top of this cover a receptacle 34 is provided for pastry or other articles and this receptacle has a cover 35 fitted thereover and formed with a deflected flange 36 disposed above the apertures 33 from the pail 10. The cover 32 is provided at each end with pivoted fasteners 37 adapted to engage a lug 38 carried by the bail brackets 39 secured to the pail 10. Upon these brackets, a handle bail 40 is mounted for convenience in transporting the pail.

In the operation of the invention it will be seen that the heater can be conveniently removed for filling and replaced beneath the liquid receptacle which, when heated, will heat the receptacle 26 supported by its cover while the steam escaping from the latter receptacle and from the liquid receptacle comes into contact with the receptacle carried by the pail cover so as to heat it without imparting any moisture thereto. This permits vegetables or other articles to be properly heated in the receptacle 26 while pastry may be similarly heated in the cover receptacle 34, and the escape of steam or vapor from both the heater and the receptacle heated thereby is deflected so as not to come into contact with the hand of the person carrying the pail while a proper ventilation and draft for the heater is also provided.

The construction prevents the steam or odor from one article or liquid from affecting another, while the several receptacles can be readily separated from each other when desired for use. It will therefore be seen that the invention presents a simple, efficient and economically constructed and compactly arranged form of a dinner pail in which a number of articles may be heated and served when desired for use and which is adapted for the cooking of materials within these receptacles if preferred. The pail and its receptacles may be formed of any desired material or configuration found most convenient and desirable for use. The pastry receptacle 34 may be provided with a pan or tray 42 disposed above the bottom thereof and with apertures 43 in its walls to prevent excessive heating thereof by the steam from the liquid receptacle.

Having described my invention and set forth its merits what I claim and desire to secure by Letters Patent is—

1. In a dinner pail, a bucket, a heater disposed therein, a liquid receptacle supported above said heater, a cover for said liquid receptacle having a depending flange spaced from the walls of the bucket and extending within the receptacle, and a food receptacle detachably mounted upon said flange.

2. In a dinner pail, a bucket, a heater disposed therein, a liquid receptacle supported above said heater, a cover for said liquid receptacle having a depending flange extending within the receptacle, a food receptacle supported upon the inner face of said cover, a cover for said bucket having draft openings in its top, and a receptacle upon its upper face.

3. In a dinner pail, a bucket, a heater disposed therein, a liquid receptacle supported above said heater, a cover for said liquid receptacle having a depending flange extending within the receptacle, a food receptacle supported upon the inner face of said cover, a cover for said bucket having draft openings and a receptacle upon its upper face provided with a cover having flanges disposed above said draft openings in the cover of said bucket.

4. In a dinner pail, a bucket, a heater mounted therein, supporting brackets carried by the inner face of said bucket, a liquid receptacle mounted upon said brackets, a cover for said receptacle having a flange depending within the receptacle, a food receptacle mounted within said flange, and means carried by said flange for retaining said food receptacle.

5. In a dinner pail, a bucket, a heater mounted therein, supporting brackets carried by the inner face of said bucket, a liquid receptacle mounted upon said brackets, a cover for said receptacle having a flange depending within the receptacle, a food receptacle mounted within said flange, a spring clasp carried by said flange to engage the bottom of said food receptacle, and a spring mounted upon the inner face of said cover to normally force the food receptacle away therefrom.

6. In a dinner pail, a bucket, a heater mounted therein, supporting brackets carried by the inner face of said bucket, a liquid receptacle mounted upon said brackets, a cover for said receptacle having a flange depending within the receptacle, a food receptacle mounted within said flange, a spring clasp carried by said flange to engage the bottom of said food receptacle, a swing clasp carried by said cover, and a coöperating latch member carried by the liquid receptacle to engage said clasp.

7. In a dinner pail, a bucket provided with draft openings at its lower portion, a heater disposed therein, a cover for said bucket provided with draft openings in its top and a receptacle upon its upper face, a cover for said receptacle having inclined depending flanges disposed above the draft openings of the bucket cover, and a food receptacle supported within said bucket.

8. In a dinner pail, a bucket provided with draft openings at its lower portion, a heater disposed therein, an apertured cover for said bucket provided with a receptacle upon its upper face, a cover for said receptacle having inclined flanges disposed above the apertures of the bucket cover, a liquid receptacle supported within said bucket, and an apertured cover secured to said liquid receptacle.

9. In a dinner pail, a bucket provided with draft openings at its lower portion, a heater disposed therein, an apertured cover for said bucket provided with a receptacle upon its upper face, a cover for said receptacle having inclined flanges disposed above the apertures of the bucket cover, a liquid receptacle supported within said bucket, an apertured cover secured to said liquid receptacle, and a food receptacle supported from the inner face of the liquid receptacle cover and within said liquid receptacle.

10. In a dinner pail, a bucket provided with draft openings at its lower portion, a heater disposed therein, an apertured cover for said bucket provided with a receptacle upon its upper face, a cover for said receptacle having inclined flanges disposed above the apertures of the bucket cover, a liquid receptacle supported within said bucket, an apertured cover secured to said liquid receptacle, a food receptacle supported from the inner face of the liquid receptacle cover and within said liquid receptacle, means for retaining said food receptacle upon the liquid receptacle cover, and means for automatically separating said food receptacle from said cover.

In testimony whereof I affix my signature in presence of two witnesses.

DAVID H. MORRELL.

Witnesses:
CHRIS DREITZLER,
THADEUS E. SMITH.